Figure 7:
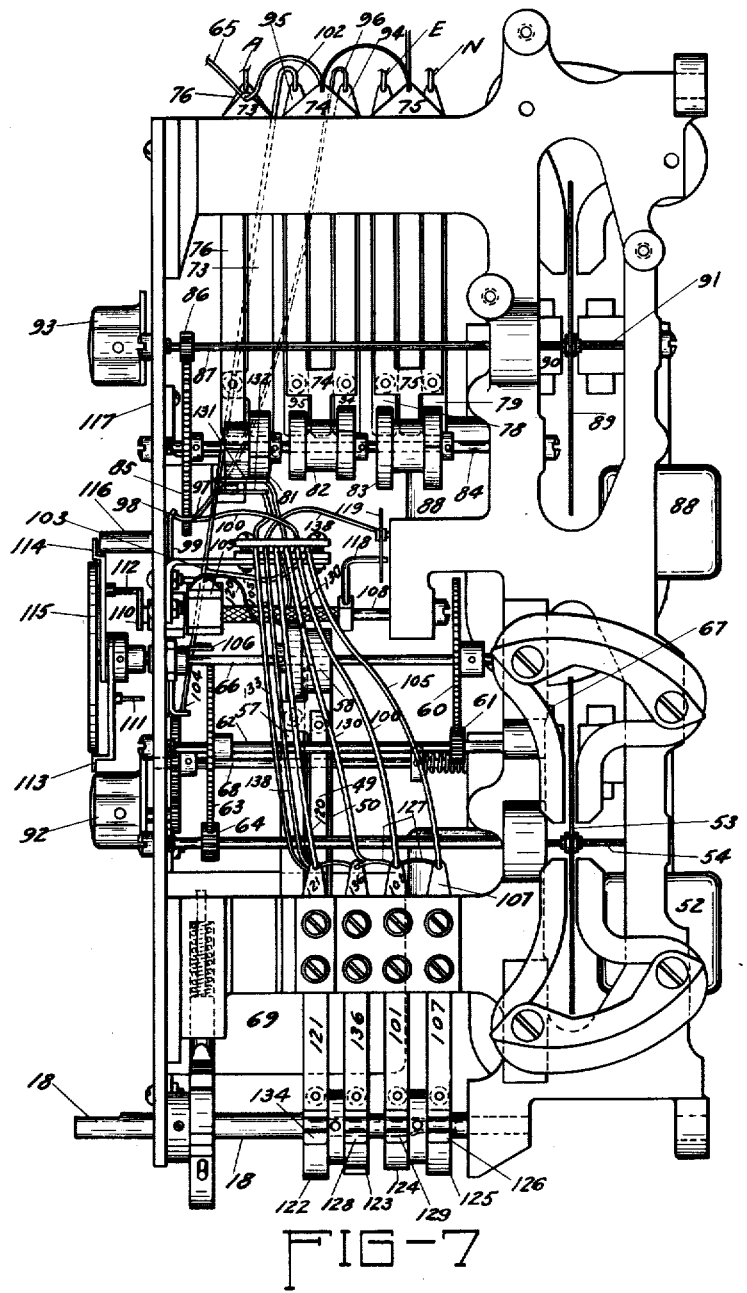

Dec. 20, 1938.   E. J. SCHULENBURG   2,141,046
SIGNAL CONTROL SYSTEM
Original Filed Aug. 8, 1929   10 Sheets-Sheet 1
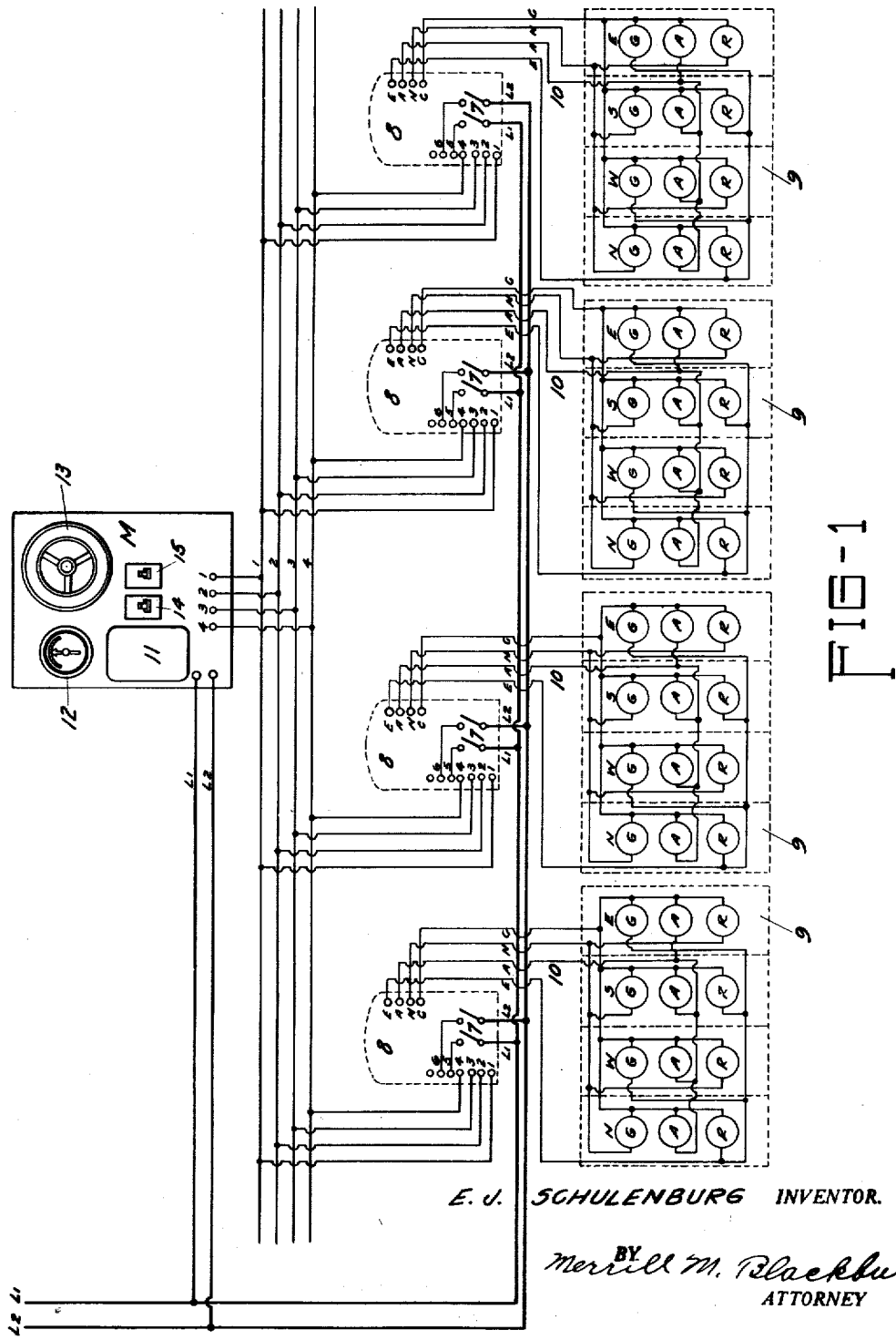
E. J. SCHULENBURG INVENTOR.
BY Merrill M. Blackburn
ATTORNEY

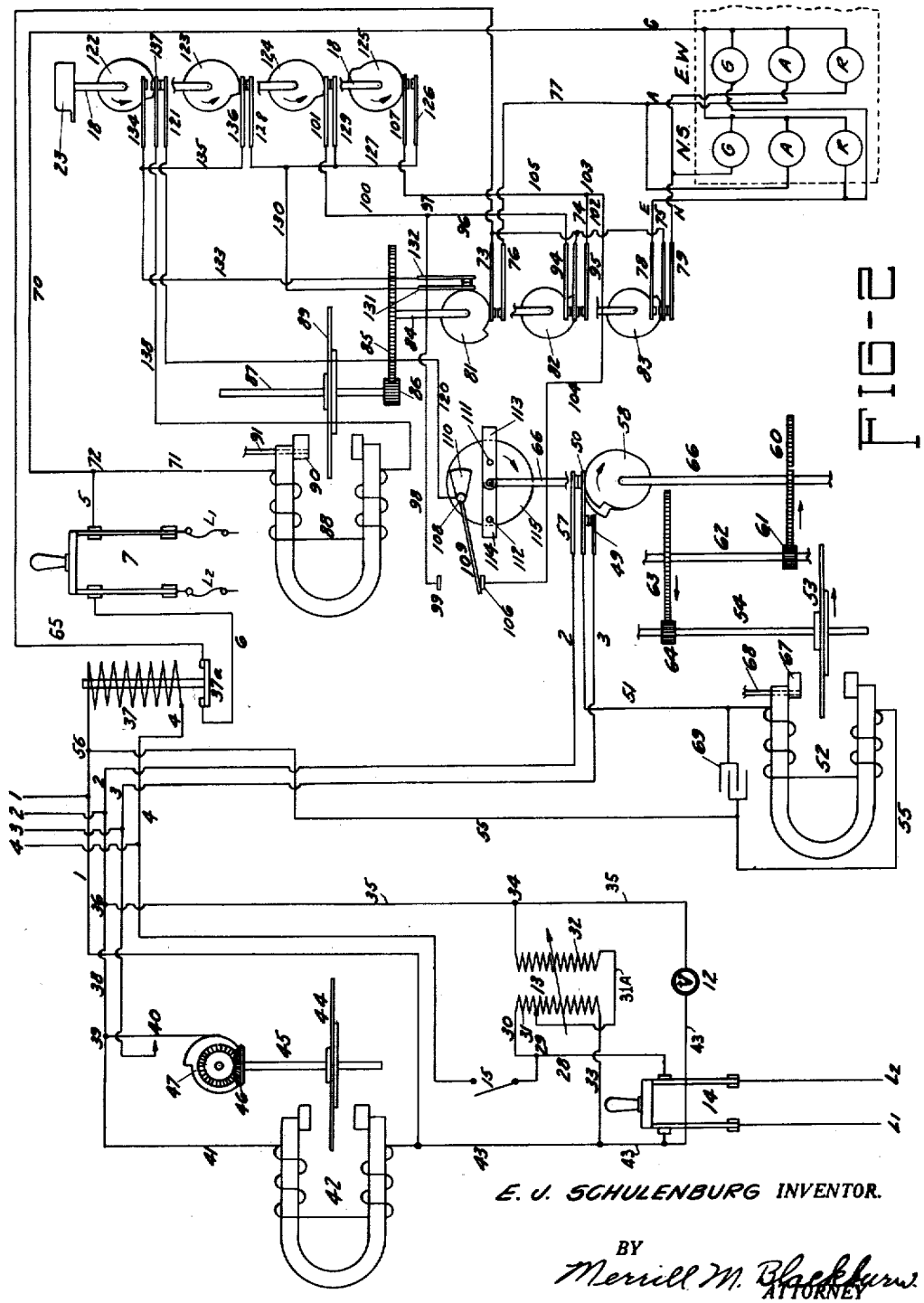

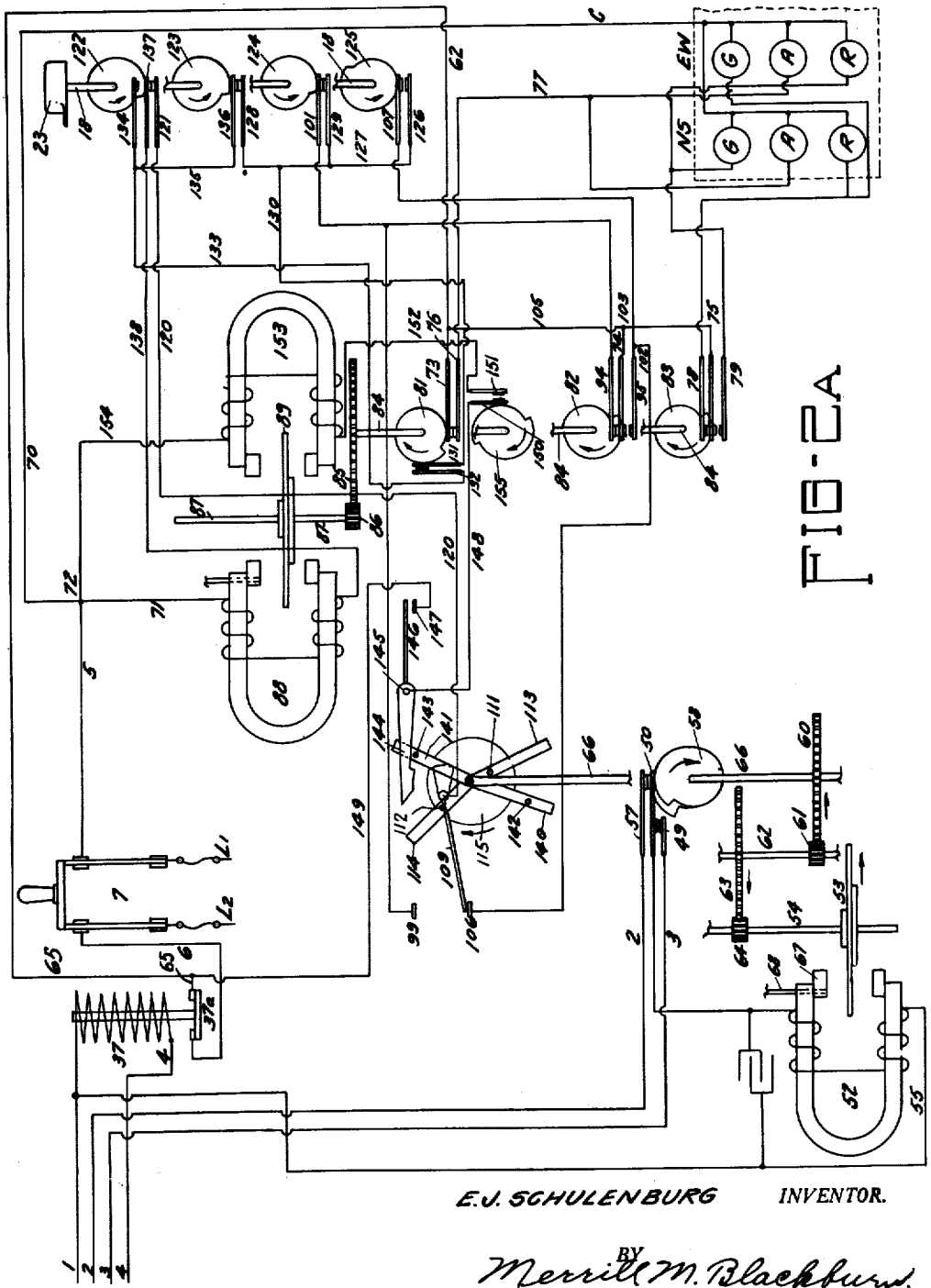

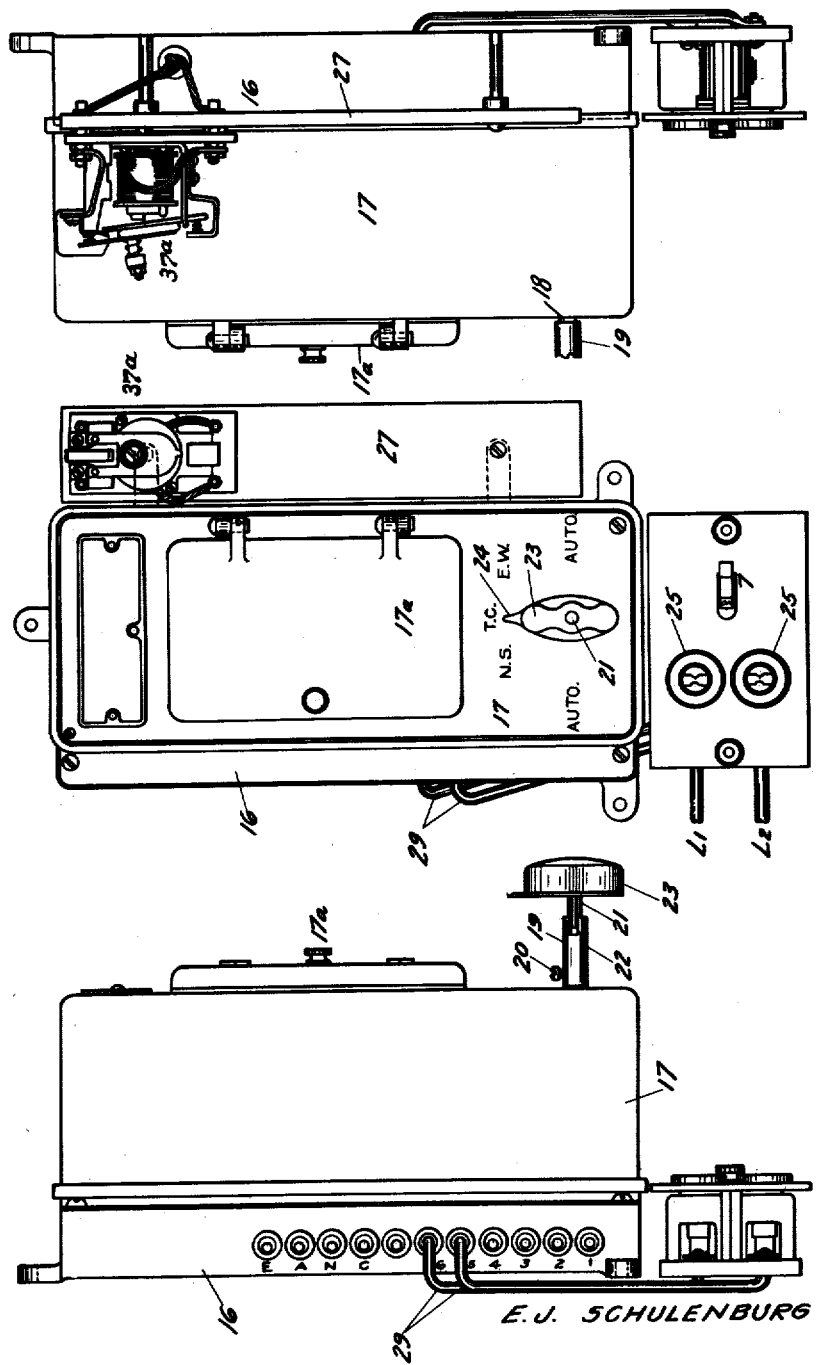

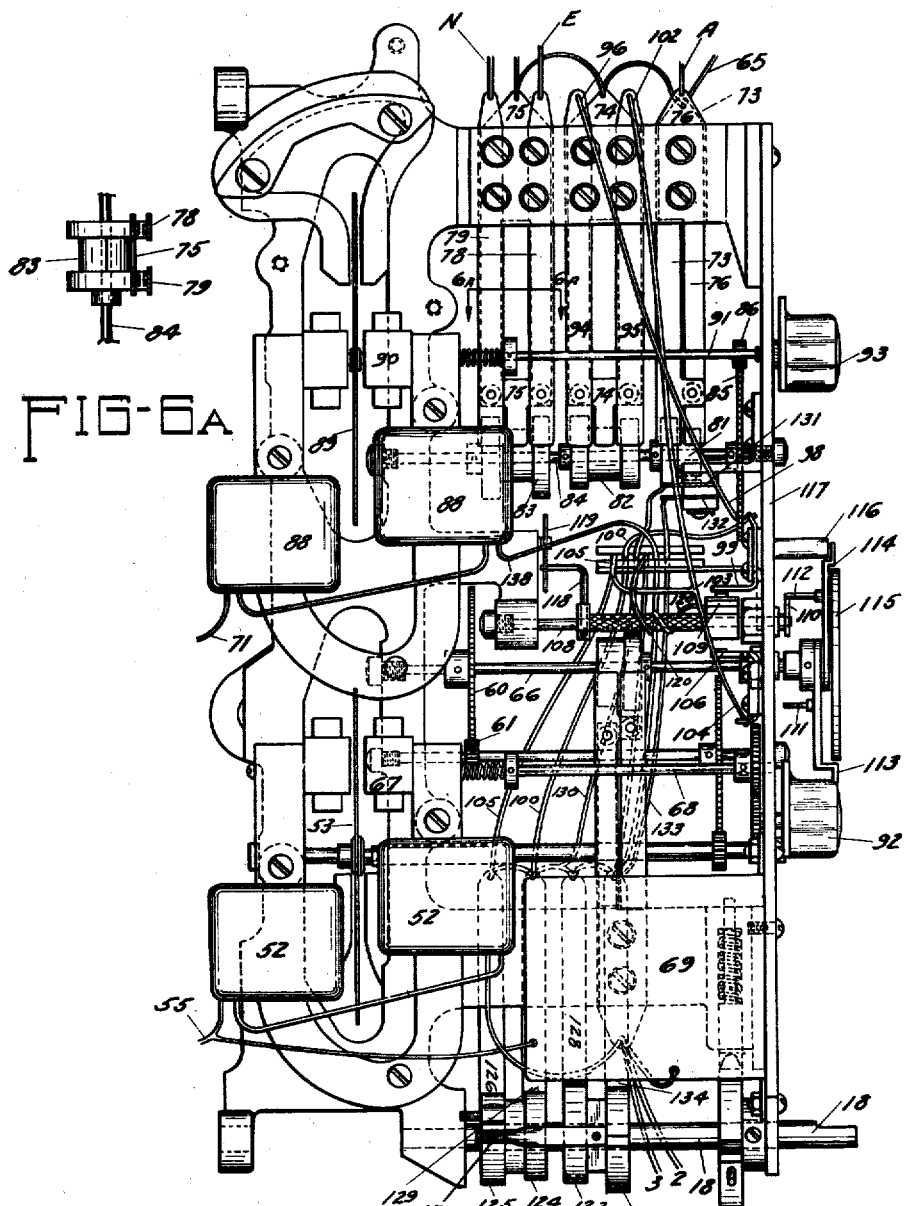

Dec. 20, 1938.  E. J. SCHULENBURG  2,141,046
SIGNAL CONTROL SYSTEM
Original Filed Aug. 8, 1929   10 Sheets-Sheet 6

E. J. SCHULENBURG INVENTOR.

BY
Merrill M. Blackburn
ATTORNEY

Dec. 20, 1938. E. J. SCHULENBURG 2,141,046
SIGNAL CONTROL SYSTEM
Original Filed Aug. 8, 1929 10 Sheets-Sheet 7
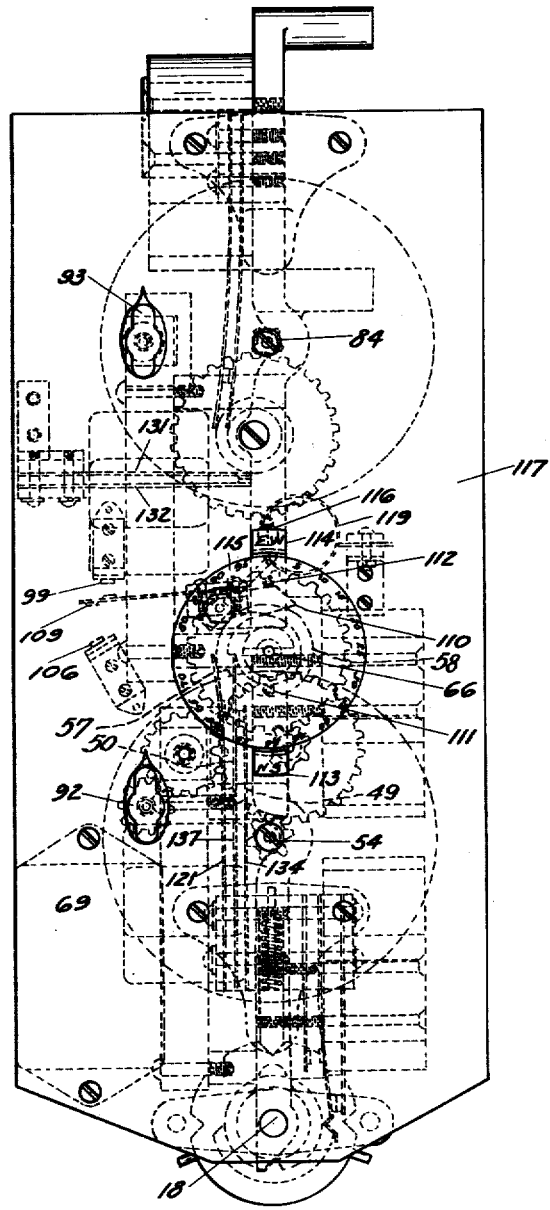
FIG-8 E.J. SCHULENBURG INVENTOR
BY Merrill M. Blackburn.
ATTORNEY

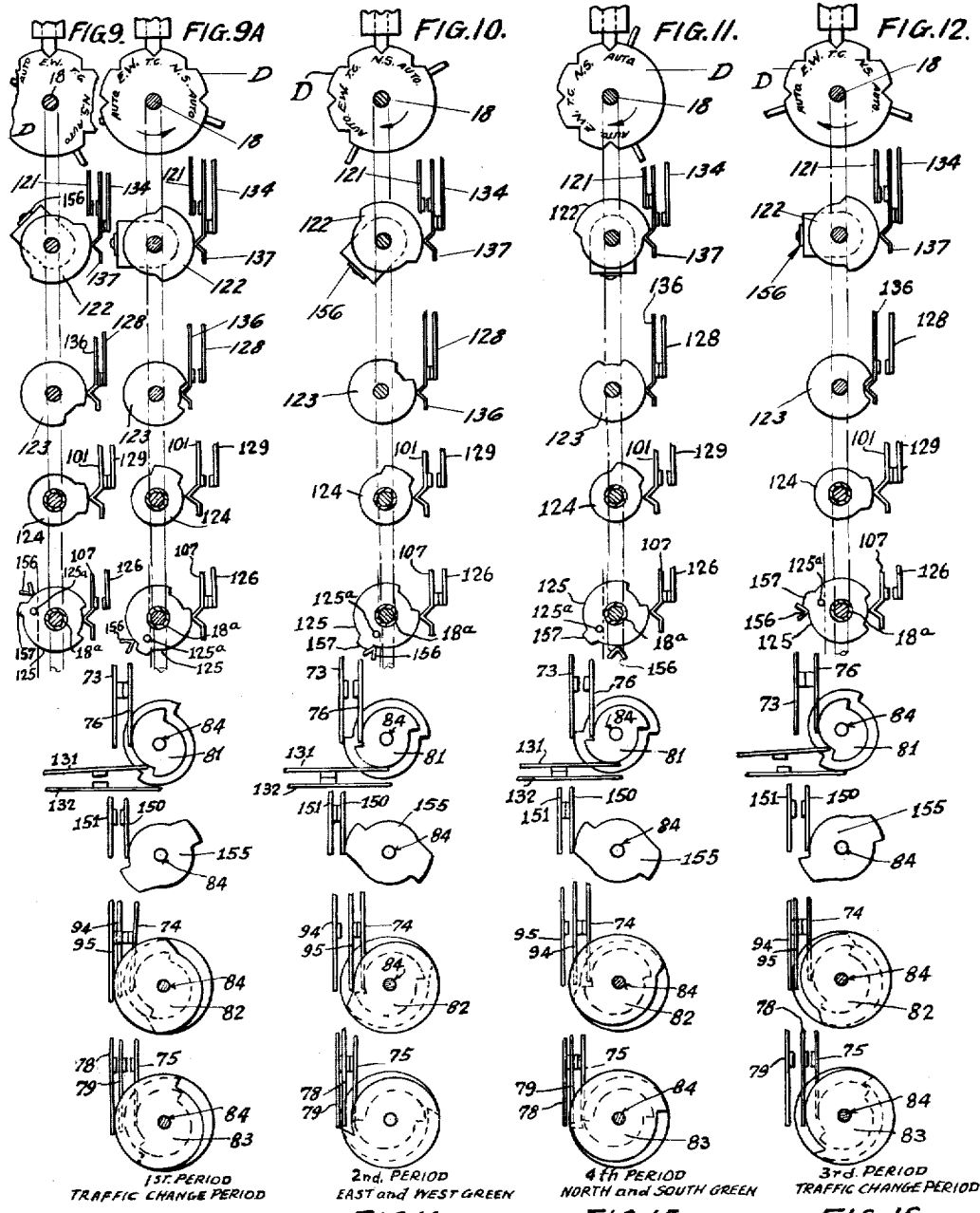

Dec. 20, 1938. E. J. SCHULENBURG 2,141,046
SIGNAL CONTROL SYSTEM
Original Filed Aug. 8, 1929 10 Sheets-Sheet 9

Inventor.
E.J.Schulenburg.
by [signature]
his Attorneys.

Dec. 20, 1938.  E. J. SCHULENBURG  2,141,046
SIGNAL CONTROL SYSTEM
Original Filed Aug. 8, 1929    10 Sheets-Sheet 10

Inventor.
E. J. Schulenburg.
by Burton & Burton
his Attorneys.

Patented Dec. 20, 1938

2,141,046

UNITED STATES PATENT OFFICE 2,141,046

SIGNAL CONTROL SYSTEM

Edward J. Schulenburg, Moline, Ill., assignor, by mesne assignments, to Eagle Signal Corporation, Newton, Mass., a corporation of Massachusetts Application August 8, 1929, Serial No. 384,322
Renewed June 5, 1937

19 Claims. (Cl. 177—337)

The present invention pertains to a system whereby a plurality of groups of lights may be controlled so as to effectively and efficiently control the flow of traffic along a plurality of streets, either parallel or intersecting or both. Heretofore, to my knowledge, in the control of traffic signals, there have been two main systems in comomn use. One of these consists in controlling the lights for each intersection by means of an individual control mechanism governing the lights of one intersection only. The other is a synchronized system in which the lights of a number of intersections are controlled by a master controller which causes all lights to be changed simultaneously. That is, with the beginning of the change period the traffic change lights of each signal, which are usually amber lights, are flashed on in all signals of the signal system simultaneously and then, after a given period which varies in different cities or even at different times in the same city, the traffic change lights, together with the lights with which the traffic change lights may overlap, are all flashed off and the other lights turned on. With the individual automatic control, it is almost impossible to keep the controllers operating at identical speeds so that the lights will be properly synchronized. On the other hand, with the previously mentioned type of synchronized system, there is no adjustability of timing among the lights at the various intersections. Neither the percentage of the total cycle given to each "stop" and "go" period nor the time of initiation of these periods at one intersection in relation to the time of initiation of the corresponding periods at an adjoining intersection can be varied. This prevents the system from providing efficient control of traffic, because the adjustment facilities needed to permit a continuous movement of vehicles through signalized areas at predetermined speeds are lacking. It is therefore desirable to have an automatic coordinated system so that the lights can be made to function in a definite readily adjustable relation with respect to each other. It is not necessary or even desirable that the lights indicating "stop" and "go", at a series of street intersections, should occupy the same time intervals. Neither is it desirable that the time intervals at various street intersections should be equal. However, it is desirable that the complete cycle of operation of the lights at the various intersections should occupy the same time in order that the traffic may be handled most expeditiously. I have therefore provided a system in which the control mechanisms of the light groups at the various intersections will run through their cycles from the beginning to the end thereof and then stop and wait for a new starting impulse to be given to them. This stopping point is not necessarily at the beginning of a signal period but may be anywhere within any signal period. It is therefore possible with this system to keep signals in a definite time relation with respect to each other and, at the same time, to divide up the complete signal cycle into any desired parts.

Among the objects, therefore, of my present invention is to provide a traffic control system in which the time intervals of the lights may be adjusted as desired and in which the beginning of the cycles of operation of the machine may be synchronized; to provide a traffic control system in which the functioning of the lights at various intersections may be coordinated so as to provide a maximum flow of traffic; to provide a traffic control system in which the functioning of the lights at various intersections may be coordinated so as to provide a maximum flow of traffic and in which the control means for the lights at the various intersections may be periodically put into synchronism; to provide a system of the character indicated in which lights are individually controlled by separate controlling means and in which the separate controlling means are caused to so function that particular points in their cycles of operation are periodically brought into synchronism; and such further objects, advantages and capabilities as will hereafter appear and as are inherent in the mechanism herein disclosed. My invention further resides in the combination, construction and arrangement of parts illustrated in the accompanying drawings and, while I have shown therein what is now considered the preferred embodiment of my invention, I desire the same to be understood as illustrative only and not to be construed in a limiting sense.

Figure 17:
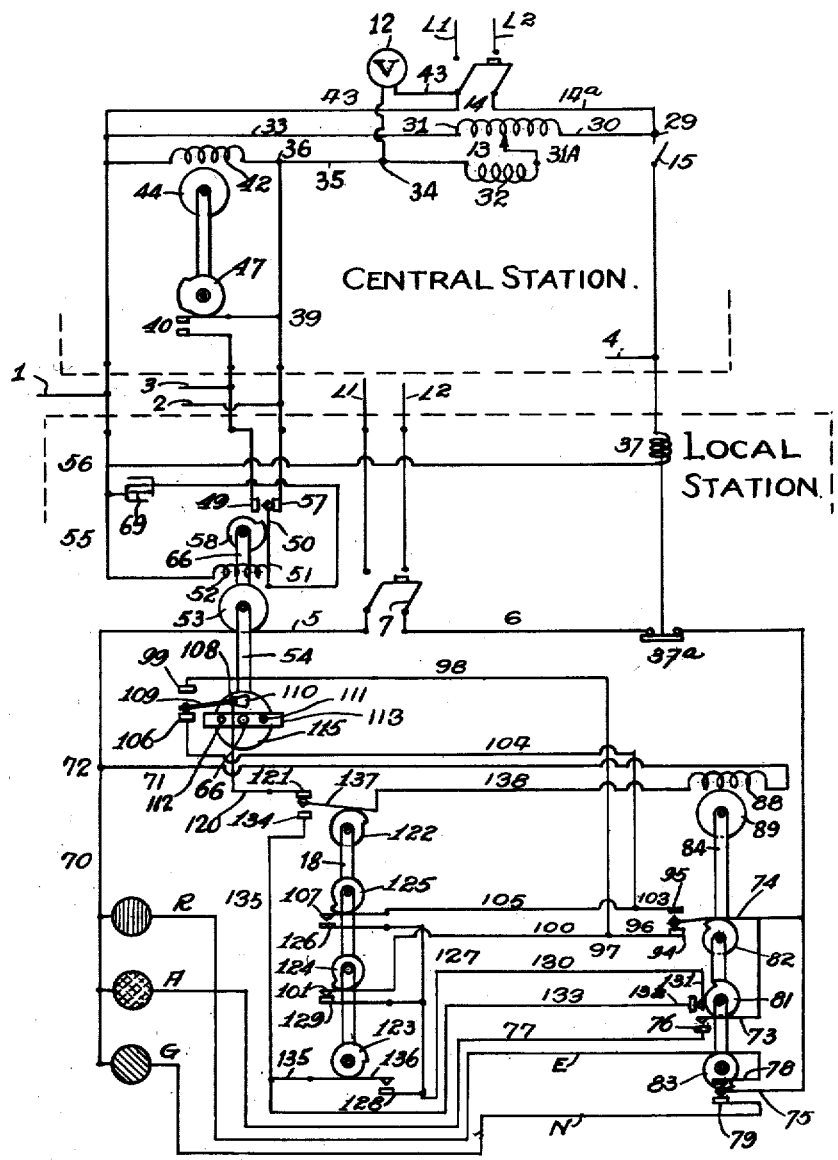
Figure 18:
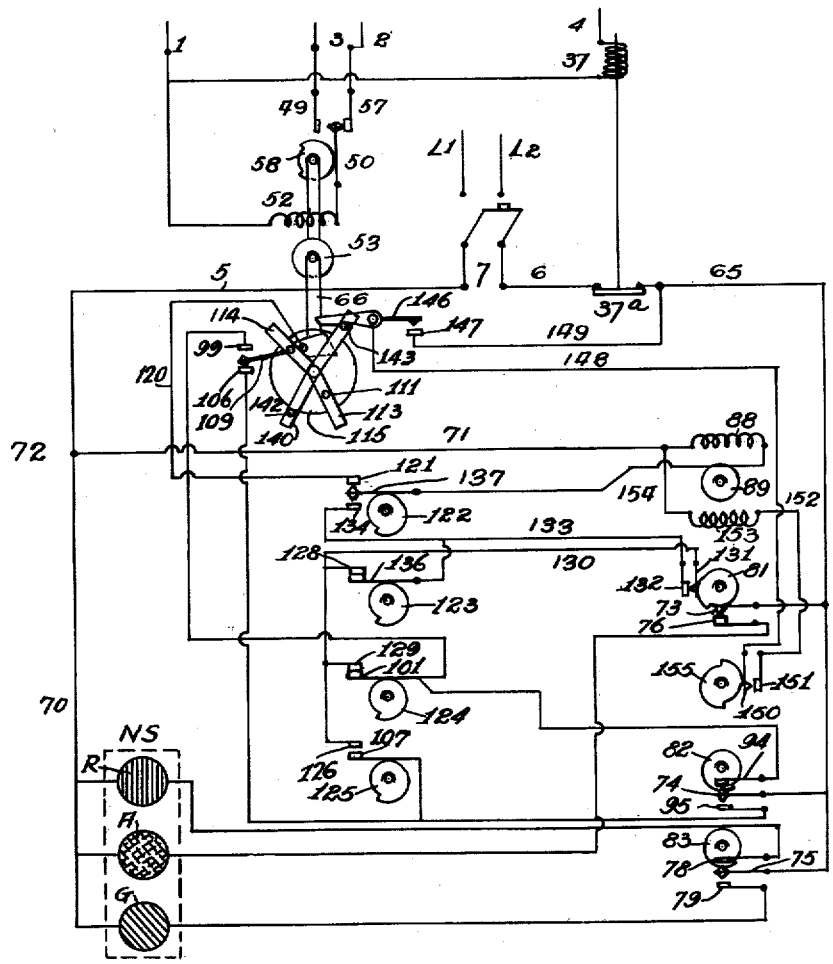

In the drawings annexed hereto and forming a part hereof, Fig. 1 is a wiring diagram intended to illustrate how the functioning of the lights at any number of intersections may be controlled; Fig. 2 is a diagrammatic view illustrating at the left side the master timer for coordinating the functioning of the various unit controllers and at the right side one of these controllers and a portion of the lights controlled thereby; Fig. 2A is a diagrammatic illustration of another circuit of a unit controller embodying this invention; Fig. 3 shows a side view of one of the unit control boxes and a fuse and switch box connected thereto; Fig. 4 is a face view of the construction shown in Fig. 3; Fig. 5 is a view of the construction shown in Fig. 3, looking at the opposite side thereof; Fig. 6 is a side view of the internal mechanism of one of these unit controllers; Fig. 6A is a sectional detail illustrating a set of contacts and the cams for operating same; Fig. 7 is a side view taken from the opposite direction from that of Fig. 6; Fig. 8 is a front view of the construction shown in Figs. 6 and 7; Figs 9, 9A, 10, 11 and 12 are more or less diagrammatic views illustrating how certain cams and switches co-operate in their various positions for the controlling of the traffic lights when the control is taken out of the automatic system and operated manually; Figs. 13, 14, 15 and 16 are also diagrammatic views illustrating various other cams and switches co-operating during a complete cycle of operation of the traffic controller system. Figure 17 is an across-the-line diagram of the arrangement shown in Figure 2. Figure 18 is an across-the-line diagram of the arrangement shown in Figure 2A.

Referring now in more detail to the annexed drawings, reference characters L1 and L2 denote the power lines leading from the city source of power or any other convenient source. These power lines have branches leading to the various controllers and these branches are denoted by the same reference characters. The master timer and unit controllers may receive their supply of current from separate and distinct sources of supply if desired. The master timer is denoted by the letter M and from this lead four distribution lines denoted by the numerals 1, 2, 3 and 4. These conductors may be termed the "primary distribution system". They are connected to similarly numbered binding posts in the several unit or local controllers. In these local controllers are other conductors 5 and 6 which are or may be connected to the power lines L1 and L2 or some other source of power by a suitable switch or switches denoted by the numeral 7. The local controllers are denoted by the numeral 8 and from these local controllers extend the "secondary distribution system", the elements of which are denoted by the letters E, A, N and C. These conductors lead to the respective signal units denoted by the numeral 9. These signal units are shown as of the common four way type which has three colored lights upon each of its four faces, these lights being respectively, green, amber and red. In such a signal, there are 12 lights in all. The conductors E, A and N, denoted generally by the numeral 10, are connected to one side of the lights in the signal units 9 and the common return C is connected to the opposite sides of all of these lights, thus completing the circuit therethrough. It will of course be understood that the signal light heads may be made with the colored lights facing in more or less than four directions as indicated in the present drawings, that number beng chosen for illustration because of the fact that it occurs more often than any other number. Also, it will be understood that it is not necessary to use a single light head supported upon a post in the middle of the intersection or suspended from cables above the intersection, as separate lighting units upon each of the four corners of the intersection may be controlled in the same way as if all were combined into a single unit as suggested above. It will therefore be understood that the present disclosure is merely for the purpose of illustration of the principle involved.

In Fig. 1 the letter C denotes the common return which cooperates with all of the other wires of the secondary distribution system in completing the circuits. E denotes the wire leading to the green or "go" signals for east and west traffic. This same wire has connection with the red signal for north and south so that when east and west traffic gets the green signal, north and south traffic will get the red signal. Similarly, N denotes the wire leading to the green signals for north and south traffic and the red signals for east and west traffic. The wire denoted by the letter A has branches leading to all of the amber or yellow lights which are used to denote a traffic change. This is all in accordance with prevailing custom and therefore needs no further description.

In Fig. 1 numeral 11 denotes the location of the motor which serves to send out the starting impulse which causes all unit controllers to start functioning at the beginning of their cycle. Within the master timer box is an instrument 12 which may be structurally a voltmeter provided with a special dial graduated in time units for indicating the duration of the cycle, and means 13 for varying the effective voltage to be supplied to the timers and thus controlling the rate of functioning of the master timer and of an element of each associated unit controller. Switches 14 and 15 are also located in this master timer box. These are manual switches for controlling the supply of current to the primary distribution circuit.

More particular reference will now be made to Figs. 3, 4 and 5 of the drawings for a description of the external structure of the unit controller. This comprises a base 16 to which is secured a box 17 provided with a cover 17a whereby convenient access may be had to the means for making adjustments and for viewing the controller dial. Projecting through the box 17 is a shaft 18 to which is fastened a sleeve 19, the two being shown as removably connected by means of the screw 20. The shaft 21 is connected to the sleeve 19 by a pin and slot connection 22 as shown most clearly in Fig. 3. A handle 23 is fixedly connected with the shaft 21; which shaft, acting through the shaft 18, serves as a means for adjusting the cams carried thereby as shown in Figs. 2 and 9–12 and as will be explained later.

The handle or knob 23 serves as means whereby the functioning of the mechanism can be placed under automatic control or can be controlled manually, as desired. As shown in Fig. 4, the indicator 24 points to T. C., indicating "traffic change" which, means that the amber light is on. The letters "E. W." to the right of "T. C." would indicate to the officer in charge which way to turn the handle 23 in order to give east and west traffic the right of way. Similarly, the letters "N. S." would indicate which way to turn the handle to give north and south traffic the right of way. "Auto." at the extreme right and left indicates that the handle may be turned to either one of these positions to set the system operating automatically. The numerals 25 designate safety fuses in the primary distribution system whose purpose is that of preventing an undue flow of current through the device, as is customary. A switch handle controls the switch blades 7 indicated in Fig. 1. A panel 27 is mounted at the side of the base 16 and carries an electro-magnetic switch 37a, shown most clearly in Fig. 5.

Fig. 2 shows diagrammatically and in considerable detail the circuits and part of the mechanism of the master controller and one local unit of the equipment shown in Fig. 1. For illustrations of cam shapes and contacts and their relationship to each other at different points in a cycle, the reader is referred to Figs. 9 to 16 inclusive as elsewhere through the drawings no attempt has been made to illustrate cam shapes and relationships. At the left of Fig. 2, the circuits of the master controller are shown while the circuits of a local controller with the circuits of a typical signal are shown at the right.

The master controller consists essentially of a variable speed motor, 42, driving through a system of gears, 46, a cam 47 which periodically opens and closes contacts 40; a voltage regulator or variable voltage auto transformer 13; switches 14 and 15; cycle indicator 12; and, of course, the necessary connecting wires and supporting panel. The purpose of the master controller is twofold:—first, to provide a means of varying the voltage applied to motor 52 of the local unit controllers to control their speed of operation and, second, to provide a brief electrical impulse for synchronizing all local unit controllers once every complete cycle of signal operation. The variable voltage is provided by the variable voltage transformer or voltage regulator 13 and the synchronizing impulse is provided by the action of contacts 40, all as will be clearly set forth later.

The circuits of the master controller are as follows: L1 and L2 represent the two sides of an alternating current power supply. Usually L1 is a grounded conductor and L2 is referred to as the "hot" side of the line.

The power supply circuit of transformer 13 starts at L2 and passes through one blade of switch 14, wires 28 and 30, winding 31, wires 33 and 43, to the other blade of switch 14 and back to L1. The power output circuit of transformer 13 includes four different paths. First, there is the path which supplies power for motor 42 and which may be considered as starting at junction 34 and includes wires 35, 38 and 41, motor 42, wires 43 and 33, part of coil 31, connecting wire 31A, and coil 32 which completes the circuit to junction 34. The magnitude of the current supplied to motor 42 over this circuit determines in part the speed of rotation of disk 44. Secondly, there is the path through cycle indicator 12, which indicator incidentally is essentially of voltmeter construction and so calibrated that its readings indicate the time of one complete cycle of signal light operation. The circuit of cycle indicator 12 may be considered as starting at junction 34 and passing over wire 35, through cycle indicator 12, wires 43 and 33, part of coil 31, connecting wire 31A, and coil 32 which completes the circuit to junction 34. Thirdly, there is the circuit over which current reaches motor 52 of the local unit controller during most of a cycle of signal operation. This circuit may be considered as starting at junction 34 and including wires 35 and 2, contact elements 57 and 50, wire 51, winding of motor 52, wires 55, 1, 43 and 33, part of coil 31, connecting wire 31A, and coil 32 which connects to junction 34, the assumed starting point of the circuit. The magnitude of the current supplied to motor 52 over this circuit determines in part the speed of rotation of disc 53. Fourthly, there is the circuit over which current reaches motor 52 during a brief part of each cycle when, as will be more fully set forth later, contact elements 57 and 50 are separated and contact elements 50 and 49 are together. If against the circuit is assumed to start at junction 34, the fourth circuit includes wires 35 and 38, contacts 40, wire 3, contact elements 49 and 50, wire 51, winding of motor 52, wires 55, 1, 43 and 33, part of coil 31, connecting wire 31A, and coil 32 which connects to junction 34, the starting point of the circuit.

Still another circuit issues from the master controller for the purpose of providing means for the remote control of relay switch 37a. This circuit may be assumed to start at L2 and pass over one blade of switch 14, wire 28, switch 15, wire 4, coil 37 of relay switch 37a, wires 1 and 43, the other blade of switch 14, to power supply wire L1. From the following explanations, it will be apparent that energization of coil 37 closes switch 37a and permits power to flow to parts of the circuit of the local controller and to the signal light 9 and that opening the circuit to coil 37 opens the path of current to said parts of the system. Switch 15 is therefore a remote "start up" or "shut down" switch for the control of signal lights at a distance from the master controller.

It will be noted that branch wires 1, 2, 3 and 4 are shown in Fig. 2 issuing from wires 1, 2, 3 and 4 of the primary distribution system connecting the master controller to the local unit controller. These branch wires may lead to a plurality of local unit controllers.

The construction and action of motor 52 and its associated gears and contacts will now be explained. A resilient contact element 57 connects the conductor 2 with the contact element 50 for the making and breaking of the circuit to the motor 52. A cam 58 mounted on the shaft 66 actuates the switch elements 50 and 57, these elements being placed one above the other and one of them spaced slightly forward of the other (see Fig. 8). The cam includes two sections so disposed with relation to each other that the element 50 will be permitted to drop before the element 57 drops. This results in the closing of the circuit between 49 and 50 and the opening of the circuit between 50 and 57. When the second element of the cam advances far enough to permit element 57 to drop, the three elements will then be in contact and current will be flowing through both 2 and 3 to conductor 51 and motor 52. As the cam continues to rotate, the circuit is broken between 49 and 50 but maintained between 50 and 57 until 50 drops again by virtue of the depression in the cam face. The connection through the switch elements 49 and 50 exists during but a small portion of each revolution of cam 58.

The shaft 66 also has mounted on it near one end a dial 115 and near the other a gear 60 which meshes with a pinion 61 on shaft 62. This latter shaft carries a gear 63 which meshes with a pinion 64 mounted on shaft 54 with which the induction disk 53 is rigidly connected as set forth above. The induction motor 52 has a movable pole piece 67 by means of which the speed of operation of the motor may be adjusted. This adjustment is made by means of the shaft 68 actuated through a simple system of gearing by handle 92 (see Fig. 6). A condenser 69 is connected in shunt relation with the motor 52, the same being connected to conductors 51 and 55 as shown more clearly in Fig. 2. Its purpose is to improve the power factor of the controller unit.

With the foregoing description of the master controller circuits and the explanation of motor 52 and considerable of its associated equipment in mind, it becomes possible to explain the means which keeps dial 115 on shaft 66 of the local unit controller synchronized with cam 47 of the master controller and consequently synchronized with all corresponding dials 115 in other local unit controllers of the system. It should be borne in mind that synchronized operation of cam 47 and dials 115 of all local unit controllers is essential in the operation of the system as it is by means of this synchronized operation that signals at different intersections within the system are able to remain in step with each other.

Motor 42 and all motors 52 in the system are of a type which vary their speeds in approximately the same amounts when there is a given change in the voltage impressed upon their terminals. Therefore, any change in the output voltage of transformer 13 will cause substantially the same change in the speed of rotation of all motors 52 of the local unit controllers as occurs in motor 42.

In explaining the operation of motor 52 and the master controller, it will be assumed that the members of both the master controller and local unit controllers are at the outset in the condition illustrated in Fig. 2, with contact elements 57 and 50 together, contact elements 49 and 50 separated, and contacts 40 open. Under these conditions, the output circuit of transformer 13 can supply power to motor 52 through contact elements 57 and 50 over the path previously described and motor 52 will rotate cam 58 in a clockwise direction. Furthermore, motor 42 will receive power from the output circuit of transformer 13 over another path previously described and will drive cam 47 in a clockwise direction. If, as is the case in the practical operation of this system, motor 52 has been adjusted to drive cam 58 slightly faster than motor 42 drives cam 47, then cam 58 will be rotated to a position where contact elements 57 and 50 separate from each other before cam 47 allows contacts 40 to close and consequently motor 52 will stop through lack of power.

When contact elements 57 and 50 separate, contact elements 50 and 49 come together and with the contact elements in this condition motor 52 must remain stopped until contacts 40 close thereby completing a path for power to flow over that output circuit of transformer 13 which includes contacts 40, contact elements 50 and 49, and motor 52, as has previously been described.

Upon the closing of the circuit to motor 52 through contacts 40, motor 52 will again start to rotate and when cam 58 has advanced a few degrees contact element 57 will again be permitted to engage contact element 50 thereby relieving motor 52 from dependence upon power transmitted through contacts 40. As explained above, cam 58 will permit contact elements 50 and 49 to remain together for a brief period following the engagement of contact 57 with contact 50 and a few seconds later contact elements 50 and 49 separate, leaving, as the only path for power to flow over to reach motor 52, that path which passes through contact elements 57 and 50. Cam 47 is so shaped that contacts 40 will open a brief period after contact elements 57 and 50 come together.

From the foregoing it will be apparent that as long as motor 52 drives cam 58 at a slightly higher rate of speed throughout its revolution than the rate of speed at which motor 42 drives cam 47, there will be a brief period during each revolution of cam 58 when contacts 57 and 50 will be apart and thereby prevent the flow of power to motor 52 until such time as contacts 40 close and permit power to flow over wire 3, through contact elements 50 and 49, to motor 52, whereupon motor 52 will resume rotation of cam 58 and the cycle will be repeated. In other words, each normal revolution of cam 58 and consequently of dial 115 consists of a period of continuous rotation extending through most of the time required for the revolution, followed by a brief waiting period after contact elements 57 and 50 have separated, and then followed by the resumption of rotation when contacts 40 close. In normal operation all local unit controllers operate in the manner just described and consequently each revolution of dial 115 in all local unit controllers is initiated at the same instant by the closure of contacts 40 and, since motors 52 of all local unit controllers are adjusted to operate at substantially the same speed, then all dials 115 of the system will rotate in substantial synchronism throughout each revolution so initiated.

If for any reason cam 58 of any local unit controller of the system and consequently dial 115 should be out of step with cam 47 of the master controller, as would usually be the case for example when placing a new local unit controller into service, then contact elements 57 and 50 would become separated earlier with respect to the subsequent closure of contacts 40 in which event motor 52 of said controller would remain inert for a longer than normal period, but as soon as the subsequent closure of contacts 40 occurred, rotation of cam 58 in said controller would be resumed and dial 115 of said controller would thereafter continue its rotation in step with dials 115 of other controllers of the system.

If an operator at the master controller of the system should desire to increase or decrease the interval required for the rotation of dials 115 of the local unit controllers for the purpose of increasing or decreasing the time of each complete cycle of signal light operation, he could do so by lowering or raising the output voltage or transformer 13 in which event it is apparent from a consideration of the circuits previously described and the characteristics of motors 42 and 52 that a corresponding decrease or increase in the rate of rotation of disks 44 and 53 would occur, while at the same time each cycle of cams 58 of the local unit controllers would still consist of a period of continuous rotation and a brief waiting period after which the cycle would be resumed with dials 115 of all local controllers starting into motion in step with each other.

With the foregoing explanation in mind of the means whereby dials 115 of the local unit controllers are maintained in synchronism, the reader has been prepared for an explanation of the operation of the elements of the local unit controller which directly control the flow of current to signals 9 over wires 10. Such an explanation follows:

The current passing through switch 15, referred to above, passes through conductor 4 to the coil 37 of magnetic switch 37a and back to the junction 56 and wires 1 and 43 as referred to above. The flowing of current through the coil 37 which forms a part of the electro-magnetic switch 37a (see Figs. 4 and 5) causes closure of this switch. As indicated above, the switch 7 is connected with the power lines L1 and L2 and controls the flow of current to the unit controller. From this switch lead the conductors 5 and 6, the former being connected to the conductors 70 and 71 at 72. Conductor 6 leads to the switch 37a, from which leads the conductor 65 which carries current to the contacts 73, 74 and 75.

Cooperating with contact element 73 is a contact element 76 from which leads a conductor 77. This conductor leads to the A conductor referred to above and carries current to the amber lights. Cooperating with the contact 75 are contacts 78 and 79 from the former of which leads the conductor E referred to above. This conductor carries current to red signal lights facing in opposite directions and to green signal lights facing in directions at an angle to the directions of the other lights. From contact 79 leads the conductor N which carries current to the other signal lights. As shown at the right of Fig. 2, one set of lights may represent the control lights for east and west traffic and another the control lights for north and south traffic. Accordingly, if current flows through the E conductor the red lights in the north and south channel will be illuminated while the green lights in the east and west channel will be illuminated. Correspondingly, if current is carried by the N conductor the green lights for north and south traffic will be illuminated and the red lights in the east and west channel will control the traffic in that direction. From this it will be apparent that, if the contacts 75 and 79 are together, the circuit will be closed for north and south traffic to move and for east and west traffic to stop. Similarly, if contacts 75 and 78 are in engagement, the red light will show against north and south traffic and the green light in favor of east and west traffic. The actuation of these various contacts is accomplished by the cams 81 and 83 carried by the shaft 84. The general relationship of these cams and contacts together with the cam 82 and its associated contacts is shown in Fig. 2 while their specific relation is shown in Figs. 13 to 16. The shaft 84 carries a gear 85 which meshes with pinion 86 carried by the shaft 87 of the induction motor 88. On this shaft 87 is mounted the disk 89 of this motor. The pole 90 of motor 88 is adjusted by turning its shaft 91 just as the pole 67 of motor 52 is adjusted. Adjusting this pole piece adjusts the rate at which the motor operates. The shafts 68 and 91 are adjusted by means of handles 92 and 93, respectively (see Figs. 6, 7 and 8). From the foregoing, it will be seen that as the motor 88 operates it causes rotation of the shaft 84 and of the cams 81, 82 and 83 connected therewith.

Cooperating with the contact 74 are contacts 94 and 95. When the circuit is closed through contacts 74 and 94 current can be fed to conductor 96 which branches at 97, one branch 98 going to a contact 99 while the other branch 100 goes to a contact 101. If the circuit is closed between contacts 74 and 95 current can flow through the latter and the conductor 102 to the junction 103 from which extend the conductors 104 and 105. The former of these goes to a contact 106 while the latter leads to a contact 107.

Carried on a shaft 108 is a swinging contact arm 109 which is adapted to engage either of contacts 99 and 106. Rigidly connected with shaft 108 is a cam 110, the opposite sides of which are engaged by pins 111 and 112 carried by arms 113 and 114 which are pivotally mounted upon shaft 66 referred to above. In close association with these arms 113 and 114 is a graduated disk or dial 115 (see Fig. 8), the graduations of which are used in adjusting the positions of the arms 113 and 114. This graduated dial, rigidly mounted on shaft 66, is shown in face view in Fig. 8 and in edge view in Figs. 6 and 7. A post 116 is mounted in the face plate 117 and has an index marked thereon which cooperates with corresponding marks on the arms 113 and 114. From the foregoing, it will be seen that operation of the motor 52 causes rotation of the dial 115 and, with this, of the arms 113 and 114. Rotation of these arms carries the pins 112 and 111 around the shaft, one passing outside of shaft 108 and the other between that and shaft 66. Striking of these pins against cam 110 causes oscillation of the shaft 108 and swinging of the contact arm 109. An arm 118 (Figs. 6 and 7) is rigidly mounted on shaft 108 and is engaged by a spring 119 carried by the frame. The resiliency of this spring causes contact arm 109 to be held rigidly in contact with either 99 or 106 until either the pin 111 or the pin 112 causes rotation of shaft 108 and separation of the contacts. A conductor 120 leads from the contact arm 109 to a contact 121 of the manual control assembly.

Reference will now be made to the manual control assembly in the upper right hand corner of Fig. 2. This includes the shaft 18, previously mentioned, and the cams 122, 123, 124 and 125 cooperating with certain contact elements mentioned above and certain others to be mentioned presently. Cooperating with the contact 107 is a contact 126 from which leads a conductor 127 which is connected to a contact 128. A contact 129 cooperates with contact 101 and is connected to conductor 127 as shown in this figure. A conductor 130 leads from conductor 127 to a contact 131 which cooperates with a contact 132 and cam 81 (see Figs. 13 to 16). From contact 132 extends a conductor 133 which is connected to a contact 134. From this conductor 133 extends a branch conductor 135 which is connected to a contact 136. Rotation of cam 123 causes the circuit to be closed between contacts 136 and 128. Cooperating with contacts 121 and 134 is a contact 137 from which leads a conductor 138 which extends to the motor 88 and feeds back through conductors 71 and 5 to line conductor L1.

The structure indicated in Fig. 2A is similar to that of Fig. 2 but includes in addition thereto certain structure having a function additional to that of the structure of Fig. 2. In this construction a pair of arms 140 and 141 are mounted upon shaft 66 in the same way that arms 113 and 114 are mounted on that shaft. These arms carry pins 142 and 143 which cooperate with a crank arm 144 having a cam face for engagement by these pins. This crank arm is secured to a shaft 145 by which is carried a contact arm 146, designed to cooperate with a contact 147 in closing the circuit between conductors 148 and 149. Conductor 149 leads to conductor 65 and through this to switch 37a and through conductor 6 and switch 7 to L2. Conductor 148 leads to contact 150 which cooperates with a contact 151 from which leads a conductor 152 to a coil 153. It will be noted that herein reference is made to "motor 88" and to "motor 153". These are, in fact, the coils of a single motor comprising an induction disk 89, and the elements 88 and 153, together with necessary mechanical supports. From the motor 153 extends a conductor 154 which connects to wire 5 at junction 72. The contact 150 is actuated into engaging relationship with contact 151 and is released from engagement therewith by cam 155 mounted on shaft 84. Otherwise except as indicated in the foregoing, this construction is like that of Fig. 2.

Synchronization may be accomplished once per cycle, as recited above, or more or less than once per cycle by appropriate simple changes in the mechanism and might be accomplished by periodically slowing down or speeding up certain motors relatively to others.

From the foregoing it becomes apparent that, with switches 37a and 7 closed, it is merely necessary to provide a means for rotating cams 81 and 83 in order to cause the signal lights to flash on and off in a desired sequence. Cams 81 and 83 are rotated when power is supplied to motor 88 and, as will presently be made clear, the supply of power to motor 88 may be controlled automatically by the contacts 109, 99 and 106 which are operated by pins 111 and 112 associated with dial 115 or may be controlled manually by the action of the manual control contacts associated with cams 81, 122, 123, 124 and 125. In other words, the signal lights are controlled by contacts actuated by motor 88 which motor in turn is controlled automatically or manually by suitable switching means. The automatic control of the signal will first be explained.

Cam 82 as will be apparent from Figs. 2, 14 and 15, is so shaped and so functions with respect to contact elements 74, 94 and 95 that contacts 94 and 74 are in engagement when power is able to flow through contacts 75 and 79 to the north and south green lights and the east and west red lights. Correspondingly, contacts 95 and 74 are in engagement when power is able to flow through contacts 78 and 75 to the east and west green lights and the north and south red lights. It is important that these relationships be borne in mind because it is such relationships which enable the engagement of contact 109 with contact 106 to cause signal lights to be switched by the action of motor 88 to only the north and south green condition and the east and west red condition and which enable the engagement of contacts 99 and 109 to cause signal lights to be switched to only the east and west green condition and the north and south red condition. In other words, during automatic operation of the signals a definite relationship must exist between the position of dial arms 113 and 114 and the condition of the signal indications.

After signal indications have been in the north and south green condition for the proper length of time as determined by the speed of rotation of dial 115 and the position of arms 113 and 114 on said dial, pin 112 will engage the upper surface of cam 110 and cause contact arm 109 to engage contact 99. Then, since contacts 94 and 74 are in engagement while signal indications are green north and south, power can flow to motor 88 to switch signals to the east and west green by traversing the following path: starting at L2 and passing over one blade of switch 7, wire 6, switch 37a, wire 65, contact elements 74 and 94, wires 96 and 98, contacts 99 and 109, wire 120, contacts 121 and 137, wire 138, winding of motor 88, wires 71 and 5, other blade of switch 7 to L1. Similarly, after signals have been in the east and west green condition for the proper length of time, pin 111 will engage the under side of cam 110 causing contacts 106 and 109 to close and signals will then be changed to the north and south green condition by means of power supplied to motor 88 over the following path. Starting at L2 and passing through one blade of a switch 7, wire 6, switch 37a, wire 65, contacts 74 and 95, wires 102 and 104, contacts 106 and 109, wire 120, contacts 121 and 137, wire 138, winding of motor 88, and back to terminal L1 over the path previously described.

Cam 82 is so shaped that shortly after motor 88 starts into motion to accomplish a switching operation as above described, contact 75 disengages whichever one of contacts 78 or 79 it may previously have been engaging and does not engage the other of said contacts until the switching operation is nearly complete. In the meantime, contacts 73 and 76 have come together at substantially the same instant as contact 75 became disengaged from contact 78 or 79 and contacts 73 and 76 remain together until substantially the instant when contact 75 again engages either contact 78 or 79. Such action of the contacts obviously causes all green and red lights to be extinguished while the amber lights, which receive their power through contacts 73 and 76, are illuminated. The duration of the amber interval is accordingly determined by the speed at which motor 88 accomplishes this switching operation and is independent of the rate of rotation of dial 115 so long as there is ample time allowed between actuations of contacts 99, 109 and 106 to permit motor 88 to complete its switching operation.

Reference now being made to Figs. 2 and 9 to 12 inclusive, when the handle 23 is in the position shown in Fig. 4, the mechanism will not function automatically because the handle is set in one of the manual positions and the contacts are consequently arranged accordingly. Referring next to Fig. 11, we see that the shaft 18 is turned to one of the automatic positions as indicated on the dial D. This dial is provided with a plurality of notches which cooperate with a resiliently actuated member to hold the parts in any selected position of adjustment. To get the shaft 18 into the position shown in Fig. 11 the same was turned in a counter-clockwise direction. In changing from the automatic position as illustrated in this figure, the shaft must be turned in a clockwise direction and the next functional position will be such as to give north and south traffic the right of way. If at the time of change from the automatic position to the manual position, north and south, the controller parts 81, 82, 83 and 84 are in the north and south position no change will take place. If these controller parts are in the east and west position at the time of this change then the control will automatically change into the north and south position. This is caused by contact 137 being separated from contact 121 and being put into contact with element 134. By referring to Fig. 10 it will be seen that this is the only functional change which takes place in these contacts in going from the position in Fig. 11 to the position in Fig. 10. In changing from the north and south position to the east and west position shown in Fig. 9, the dial D is turned in a clock-wise direction through the position shown in Fig. 12.

In changing from the east and west position shown in Fig. 9 to the north and south position shown in Fig. 10, the dial D is turned in a counter-clockwise direction through the position shown in Fig. 9A. When the manual control is changed from the north and south position to the east and west position or vice versa, the contacts are put in such a position that motor 88 is energized and thereby causes shaft 84 and cams 81, 82 and 83 to be rotated through a distance of 180° changing the cams from the position shown in Fig. 15 to the position shown in Fig. 14 or vice versa. If the manual control is stopped in the traffic change position when being changed from the east and west to the north and south position as shown in Fig. 9A, motor 88 will become energized, operating shaft 84 and cams 81, 82 and 83 and stopping them in a position as shown in Fig. 16. If the manual control is stopped in the traffic change position when being changed from north and south green to the east and west green position, as shown in Fig. 12, motor 88 will become energized, operating shaft 84 and cams 81, 82, and 83, and stopping them in the position shown in Fig. 13. In changing the manual control from the traffic change position as shown in Figs. 9A or 12 to the north and south position or the east and west position as shown in Figs. 10 or 9, continuing the started direction of rotation, motor 88 will be energized, causing shaft 84 and cams 81, 82 and 83 to be rotated from the positions shown in Figs. 16 or 13 to positions shown in Figs. 15 or 14.

The action of the cams shown in Figs. 9 to 12 will next be explained. Assuming that the apparatus has been functioning automatically and that the parts are in the positions shown in Fig. 11, the shaft 18 is rotated in a clockwise direction and the parts will then assume the positions shown in Fig. 10 which is the position for north and south traffic. It will be noted that with the rotation of shaft 18 cam 122 is rotated and contact 137 rides up on the projecting part of this cam to cause the breaking of the circuit between 121 and 137 and making of the circuit between 137 and 134. By referring to Figs. 9, 9A and 12 it will be seen that in all positions of shaft 18 except those in which the apparatus is operating automatically, the switch element 137 is riding on the cam projection. Returning now to Figs. 10 and 11, as the shaft 18 is rotated from the position shown in Fig. 11 to that shown in Fig. 10 cam 123 turns with shaft 18 but this makes no change in the relative positions of contact elements 128 and 136. The circuit through these two elements is therefore not affected by changing from the automatic to the north and south position. However, when the shaft rotates farther, to the traffic change position, the projecting part of element 136 which engages cam 123 drops into the notch in the face of this cam and permits the breaking of the circuit between elements 128 and 136. This, it will be noted, happens only in the traffic change position. This is true regardless of which direction the shaft 18 is rotated to the traffic change position. Returning again to Fig. 11, it will be noted that the projection of contact element 101 which engages cam 124 is riding on the low part of this cam when the parts are in the automatic position and the circuit is therefore broken between contact element 101 and 129. It should be noted, however, that when the shaft 18 is turned to the other automatic position, the contact element 101 will be riding on the high part of cam 124, the position of this cam being the same as that shown in Fig. 9. Since cams 124 and 125 are rigidly connected by the tube 18a, which is free to rotate on shaft 18 within certain limits which will be presently defined, we see that in going from the north and south position shown in Fig. 10 to the traffic change position illustrated in Fig. 12 the contact element 101 rides up from the low part of the cam 124 to the high part thereof and causes closing of the circuit between contact elements 101 and 129. The next position in the sequence of operation after that shown in Fig. 12 is illustrated in Fig. 9 which represents the positions of the parts for directing east and west traffic. It will be noted that cam 124 still occupies the position shown in Fig. 12, resilient arm 156 having slipped over projection 157 and cam 124 not having turned any farther with shaft 18. This is due to the fact that pin 125a has been turned into engagement with a fixed stop, in this instance a part of the supporting frame of the machine. Since this pin keeps cam 125 from rotating and since cams 124 and 125 are rigidly connected, the former can turn no farther than the latter. Therefore, when the pin 125a strikes the frame and stops the cam 125, it also stops the cam 124. Therefore, if we turn one position farther, to the second automatic position, cams 124 and 125 will remain in the positions shown in Fig. 9 and the circuit will be broken between elements 107 and 126, whether the parts are in this automatic position or in the east and west position. When the direction of rotation of shaft 18 is reversed and the parts are turned from the east and west position shown in Fig. 9 to the traffic change position shown in Fig. 9A, resilient arm 156, which is rigidly connected to shaft 18 and contacts with cam 125, engages projection 157 on this cam and causes the cam to rotate with the shaft. This, therefore, obviously rotates cam 124 from the position shown in Fig. 9 to that shown in Fig. 9A. This results in the breaking of the circuit between elements 101 and 129. At the same time the circuit which was open between 107 and 126 is closed as shown in Fig. 9A.

From the foregoing it will be evident to the reader that during manual control the closure of contacts 101 and 129 causes cam shaft 84 and cams 81, 82 and 83 to rotate to the same position as the position which results from the closure of contacts 99 and 109 during automatic control. Similarly, that the closure of contacts 107 and 126 during manual control causes shaft 84 and cams 81, 82 and 83 to rotate to the same position as the position which results from the closure of contacts 106 and 109 during automatic control. However, whereas motor 88 does not stop when signal lights are in the amber condition during automatic operation in the system diagrammed in Fig. 2, provision is made for the circuit of motor 88 to be interrupted by the opening of contacts 131 and 132 when the cams on shaft 18 are in the traffic change position with contacts 136 and 128 separated and consequently the amber signal may be indefinitely prolonged when signals are under manual control.

It will be seen from Fig. 2A that the arms 113, 114, 140 and 141 are adjustable around shaft 66 to vary the lengths of the periods between actuations of switch elements 109 and 146. As a consequence of the variation of the lengths of these periods the times of beginning of functioning of the motors 88 and 153 will be varied. For example, when one of the pins 142 or 143 actuates the lever 144 to cause closure of switch 146, 147, the motor coil 153 is energized and causes rotation of shaft 84 and the cams carried thereby. This shaft rotates until contact 150 is permitted to separate from contact 151, when motor 153 is de-energized and the shaft stops rotating. During this period of rotation certain changes in the relationships of the switches are effected by the cams 81, 82 and 83, causing desired changes in the illumination of the lights in the traffic signals 9. The closing of switch 146, 147 causes shaft 84 to rotate through a portion of its cycle of operation and the rotation of arms 113 and 114 with shaft 66 causes motor 88 to rotate shaft 84 the remainder of its cycle by actuating switch element 109 as described heretofore.

Since it is the opening of contacts 150 and 151 and not the opening of contacts 146 and 147, which stops motor 153, motor 153 rotates only a brief period each time contacts 146 and 147 close. This follows from the fact that motor 153 cannot rotate disk 89 for a longer period than the duration of the closure of contacts 146 and 147 and may rotate disk 89 for a shorter period if contacts 150 and 151 open ahead of contacts 146 and 147. Such being the case, the closure of contacts 146 and 147 and the consequent rotation of shaft 84 may be employed to drive cams 81, 82 and 83 to the condition where amber lights are showing whereupon contacts 150 and 151 will open. Then at the end of the desired amber period the motor 88 through the action of arm 113 or 114 on switch arm 109 will change signal lights to the north and south green or the east and west green as the case may be.

The manual control circuits of the structure covered by Fig. 2A are shown the same as those of Fig. 2 which is the more usual embodiment of the invention. Obviously, the manual control facilities as employed in the circuit covered by Fig. 2A do not function as completely as with the circuit of Fig. 2, but may be employed to switch signal lights to the steady amber condition for use as a caution night light such as is often used during periods when the usual stop-and-go signal function is unnecessary.

While I have disclosed herein certain specific embodiments of my invention, it is to be understood that this disclosure is merely illustrative of apparatus embodying the principles of this invention and that numerous changes may be made therein without departing from the spirit of said invention or the scope of the claims hereto appended. For example, the disk 89 may be under the control of one motor coil as shown in Fig. 2, two motor coils as shown in Fig. 2A or any other desired number more than 2. Also, the number of cams on shaft 84 and the switches corresponding thereto may be varied as desired. Furthermore, the number of arms on shaft 66 is not limited to two as shown in Fig. 2 or four as shown in Fig. 2A, but may be varied as necessary to accomplish the desired changes in the functioning of the lights. Also, when the number and colors of the lights in the lighting head are varied it may be necessary to vary the number and arrangement of the cams on shaft 84. It is obvious that if we have three streets intersecting instead of two it may be necessary to put on additional lights and vary the control means so as to get the proper timing of these lights. Also, in the case of irregular intersections where we have streets intersecting near together but not at the same point, it is desirable to be able to coordinate the operations of the lights at these various intersections by means of one control apparatus so that the control will be unified.

I claim:

1. In a traffic control system comprising a plurality of traffic signal stations with stop and go signals at each station, an electric motor at each station, means operated by said motor arranged to actuate said traffic signals in accordance with a predetermined cycle, an electric circuit including a common supply source of electrical energy and having a portion at each station in which the motor for that station is included, and means in said circuit for varying the voltage of the current supply to said motors, whereby the time length of the signal cycle may be varied for the signals at all the stations simultaneously, together with means for periodically opening the said portion of the circuit at each of the stations, whereby the operation of the motor for the corresponding portion is stopped, a substitute circuit in which all the said station motors are included, and means acting at definite predetermined intervals to close the said substitute circuit for restarting the operation of all the motors simultaneously and interconnected with the circuit of the station motors so that the said intervals are adjustable in proportion to the variations in the time length of the signal cycles.

2. In a traffic control system comprising a plurality of traffic signal stations with stop and go signals at each of them, an electric cycle motor at each station, means operated by said motor arranged to actuate said traffic signals in accordance with a predetermined cycle, an electric circuit including a common supply source of electrical energy and having a portion at each station in which the motor for that station is included, and means in said circuit for varying the voltage of the current supplied to said motors to alter the time length of the signal cycle at all the stations simultaneously, together with a switch in each of said portions actuated by the cycle motor in said portion for periodically opening said portion of the circuit by which current is supplied to said motor, whereby operation of that motor is stopped, a substitute circuit which includes all the cycle motors, and means acting at definite predetermined intervals to close said substitute circuit for restarting the operation of all the cycle motors simultaneously and interconnected with the circuit of said motors so that said intervals are automatically adjustable in proportion to the variations in the time length of the signal cycles produced by varying the voltage in said circuit.

3. In a traffic control system comprising a plurality of traffic signal stations with stop and go signals at each of them, an electric cycle motor at each station, means operated by said motor arranged to actuate said traffic signals in accordance with a predetermined cycle, an electric circuit including a common source of electrical energy and having parallel branches by which current is supplied to the cycle motors at the several stations, with means included in said circuit for varying the voltage of the current supply to alter the time length of the signal cycle at all the stations simultaneously, a switch in each branch associated with each cycle motor, means actuated by said motor for periodically opening said switch for opening its branch circuit, a substitute circuit which includes all the cycle motors, a switch in said substitute circuit, a master motor in the first mentioned circuit, whose terminal voltage is also controlled by the voltage-varying means, and means operated by the master motor to close the last said switch periodically to restart the operation of the cycle motors simultaneously for synchronizing the signals at the several stations.

4. In a traffic control system, a master timer, a plurality of secondary timers each including a variable speed motor, an indicator driven by said motor having adjustable members associated therewith and signal circuit contacts under the control of said adjustable members, an electric circuit connecting said master timer and said secondary timers, a master timing motor included in said master timer, means controlled by the master timer and connected with each secondary timer for periodically starting the cycle of operation of each secondary timer in time with the master timer, a common source of electrical energy connected to each secondary timer, and voltage control means for varying the speed of all secondary timers by changing the voltage of said common energy supply connected thereto.

5. In a traffic control system including stop and go signals at a succession of street intersections, the combination of a master timer and a plurality of secondary timers, one of said secondary timers being located at each of the street intersections, an individual switch device operated by each secondary timer, an individual switch mechanism for controlling the signal display, a motor arranged to advance said switch mechanism for changing the signal display upon actuation of said switch device, means for keeping each switch mechanism in a definite operating relation with its respective switch device, an adjustable means by which each switch device is actuated in a predetermined phase relationship with its associated secondary timer at intervals in a recurring cycle, and means for maintaining a definite phase relationship between each secondary timer and the master timer.

6. In a traffic control system including stop and go signals at a succession of street intersections, the combination of a master timer having a source of power and a plurality of secondary timers, one of said secondary timers being located at each of the street intersections, an individual switch device operated by each secondary timer, an individual switch mechanism for controlling the signal display, a motor having a source of power substantially independent of said first source, said motor being arranged to advance said switch mechanism for changing the signal display upon actuation of said switch device, means for keeping each switch mechanism in a definite operating relation with its respective switch device, an adjustable means by which each switch device is actuated in a predetermined phase relationship with its associated secondary timer at intervals in a recurring cycle, and means for maintaining a definite phase relationship between each secondary timer and the master timer.

7. In a traffic control system including stop and go signals at a succession of street intersections, the combination of a master timer and a plurality of secondary timers, one of said secondary timers being located at each of the street intersections, an individual switch device operated by each secondary timer including a circuit closing means and actuating means therefor, one of which means is driven in a circular path by said secondary timer and one of which means is adjustable at will to vary the intervals at which the circuit closing means is actuated in a cycle, an individual switch mechanism for controlling the signal display, a motor arranged to advance said switch mechanism for changing the signal display upon actuation of said switch device, means for keeping each switch mechanism in a definite operating relation with the switch device, and means for maintaining a definite phase relation between said switch device and the master timer.

8. In a traffic control system including stop and go signals at a succession of street intersections, the combination of a master timer and a plurality of secondary timers, one of said secondary timers being located at each of the street intersections, an individual switch device operated by each secondary timer, an individual switch mechanism for controlling the signal display, a motor arranged to advance said switch mechanism to a different position upon actuation of said switch device, means for keeping each switch mechanism in a definite operating relation with its respective switch device, means operated periodically by said secondary timer for interrupting its operation, and means operated periodically by the master timer for rendering said last-named means ineffective whereby a definite phase relation is maintained between said switch device and said master timer.

9. In a traffic control system including stop and go signals at a succession of street intersections, the combination of a master timer and a plurality of secondary timers, one of said secondary timers being located at each of the street intersections, an individual switch device operated by each secondary timer including adjustable means by which said secondary timer actuates said switch device at variable intervals in a cycle, an individual switch mechanism, a driving motor controlled by said switch device and connected for advancing said switch mechanism to a different position at each successive actuation of the switch device, means operative at least once in each cycle to prevent further movement of said driving motor until the switch device reaches a predetermined point in its cycle, means operated periodically by said secondary timer for interrupting its operation, and means operated periodically by the master timer for rendering said last-named means ineffective whereby a definite phase relation is maintained between said switch device and said master timer.

10. In a traffic control system for a succession of street intersections comprising a plurality of traffic signal stations with stop and go signals at each of them and an electrically propelled rotary switch mechanism at each station controlling said signals, a cycle motor at each station driving a rotating dial mechanism and connections by which said rotating dial mechanism governs the actuation of said switch mechanism in accordance with a predetermined cycle, means cooperating with said dial to indicate a signal condition of the cycle, a master motor and connections between said master motor and the cycle motors at the several stations for maintaining coordination between the said cycle motors, manual switch means operable for controlling said switch mechanism and for removing control of said mechanism from the cycle motor and adjustable for restoring control of said mechanism to the cycle motor, said rotating dial mechanism being conveniently visible to the operator of said manual switch means and being operable independently of the signals themselves while said signals are subject to manual control and affording visible indication of the progress of the cycle motor to guide an operator in determining when to restore control of the switch mechanism from the manual switch to the cycle motor to accomplish an immediate resumption of the coordinated timing of the signals of the system upon the termination of the manual control function.

11. In a traffic control system for a succession of street intersections comprising a plurality of traffic signal stations with stop and go signals at each of them and an electrically propelled rotary switch mechanism at each station driving a rotating dial mechanism and connections by which said rotating dial mechanism governs the actuation of said switch mechanism in accordance with a predetermined cycle, a master motor and connections between said master motor and the cycle motors at the several stations for maintaining coordination between the said cycle motors, a manual switch operable for controlling said switch mechanism independently of the cycle motor and adjustable for restoring control of said mechanism to the cycle motor, said rotating dial mechanism being operable independently of the signals themselves while said signals are subject to manual control and affording visible indication of the progress of the cycle motor.

12. In a traffic control system for a succession of street intersections comprising a master motor and a plurality of traffic signal stations with stop and go signals at each of them, a secondary timer at each station, means operated by each secondary timer arranged to actuate its respective traffic signals in accordance with a predetermined cycle, an electric circuit including a common source of electrical energy and the said master motor with a branch of the circuit extending to the secondary timer at each station, means included in said circuit for varying the voltage applied thereto and thereby varying the length of the time cycle of the master motor and the secondary timers simultaneously, a substitute electric circuit with a branch extending to each secondary timer, and means for periodically bringing the secondary timers into timed relation with the master motor including a switch for opening the branch of the first mentioned circuit and closing the branch of said substitute circuit at each respective station and a switch in said substitute circuit controlled by the master motor.

13. In a traffic control system for a succession of street intersections comprising a master motor and a plurality of traffic signal stations with stop and go signals at each of them, a secondary motor at each station, means operated by each secondary motor arranged to actuate its respective traffic signals in accordance with a predetermined cycle, means operated periodically by said secondary motor for interrupting its normal operation, and means operated periodically by the master motor for rendering said last-named means ineffective whereby a definite phase relation is maintained between said secondary motor and said master motor, a common source of electrical energy connected to the secondary motors at all the stations of the system and an adjustable voltage control means for changing the voltage of the common energy supply and thus changing the length of each cycle of signal display.

14. In a circuit controller, a switching device and a dial assembly, one of them being mounted for rotary motion with respect to the other and said dial assembly including adjustable means for actuating said switching device, a contact actuating device, electrical driving means connected in circuit with said switching device and normally operable to cause effective movement of said contact actuating device upon actuation of said switching device, and switching means adapted to render said electrical driving means inoperative unless a predetermined phase relationship exists between said contact actuating device and said adjustable means.

15. In a circuit controller, a switching device and a dial assembly, one of them being mounted for rotary motion with respect to the other, said switching device normally periodically controlling the flow of current over an electrical conducting path, and the dial assembly including members adjustable with respect to each other, at least one of which members is arranged to actuate said switching device, a rotary contact operating device of the repeating cycle type, electrical propelling means connected thereto and in circuit with said switching device whereby the closure of said conducting path through said switching device by the action of one adjustable dial member normally periodically causes said electrical propelling means to advance said contact-opening device, a second switching device and a second electrical path including a circuit interrupter responsive to said contact-operating device, said path being arranged to normally periodically conduct current to said electrical propelling means upon the actuation of said second switching device by a second adjustable member of the dial assembly, said circuit interrupter being arranged to open said second conducting path at a predetermined point in the cycle of the contact-operating device whereby said second switching device is rendered ineffective for producing rotation of said contact-operating device.

16. In a circuit controller, the combination of a switching device and a dial assembly, one of them being mounted for rotary motion with respect to the other, and said dial assembly having conveniently accessible manually adjustable actuating members for operating said switching device, a contact actuating device, an electric motor in circuit with said switching device and operable to cause movement of said contact-actuating device upon the operation of said switching device, switching means adapted to render said electric motor inoperative unless a predetermined phase relationship exists between said contact-actuating device and at least one of said adjustable actuating members, manual control means for said contact-actuating device mounted in view of said dial assembly to permit observation of the latter when the manual control means is employed, and means for rendering the said electric motor unresponsive to said switch device and rendering said motor responsive to said manual control means.

17. In a circuit controller including a dial having actuating members adjustable thereon, a switching device operable by said adjustable actuating members, a movable contact-actuating member, electrically propelled means arranged to operate said movable contact-actuating member upon actuation of said switching device, and switching means arranged to render the said switching device ineffective unless a predetermined relationship exists between said adjustable actuating members and said movable contact-actuating member, together with means for establishing said predetermined relationship between said adjustable actuating members and said movable contact-actuating member, whereby the actuation of said switching device is rendered effective.

18. In a traffic control system, stop and go signals and a traffic change signal, electric circuits for said signals respectively with switch devices controlling said circuits, a driving motor connected to actuate said switches in accordance with a predetermined cycle, a driving motor circuit including switch means for intermittently energizing the motor and adapted to stop it with the signal switches adjusted to energize the stop signal and the go signal respectively at alternate stops of the motor, means connecting the switch which controls the traffic change signal with the switch means which energizes the motor so as to energize said signal while the motor is running and adapted normally to shut off said change signal at the end of each cycle of the motor, automatic means normally re-starting the motor at predetermined intervals to control the timing of the signal cycle, and manually operable switch mechanism in the driving motor circuit adapted for opening and closing said circuit at will to permit holding the motor at rest independently of the automatic timing means and with the traffic change signal at display, thus temporarily prolonging the period of the traffic change signal and the stop or go signal which is displayed simultaneously therewith.

19. In a traffic control device, stop and go signals and a traffic change signal, a source of energy supply, a driving motor, switch mechanism actuated thereby connected for energizing the stop and go signals alternately, and including means to arrest the motor when either the stop signal or the go signal is energized for display, said mechanism also including means by which the traffic change signal is energized only when the driving motor is running, a cycle-timing motor and a second switch mechanism actuated periodically thereby and connected for restarting the driving motor after each arrest thereof, to change the signal display, a separate electric circuit in which a common source of electrical energy and all of said cycle motors at the several stations are included, and means in the cycle motor circuit, but not included in the driving motor circuit, for varying the voltage of the current supplied to said cycle motors to regulate the time length of the signal cycle for all the stations simultaneously, the current supply for the driving motor at each station being thus unaffected by the variation in the voltage of the current supply for the cycle motors, whereby the driving motor speed is independent of adjustments of the voltage-varying means for altering the length of the cycle.

EDWARD J. SCHULENBURG.

---

CERTIFICATE OF CORRECTION.

Patent No. 2,141,046.                           December 20, 1938.

EDWARD J. SCHULENBURG.

It is hereby certified that error appears in the printed specification of the above numbered patent requiring correction as follows: Page 10, second column, line 6, claim 15, for the word "contact-opening" read contact-operating; and that the said Letters Patent should be read with this correction therein that the same may conform to the record of the case in the Patent Office.

Signed and sealed this 27th day of June, A. D. 1939.

Henry Van Arsdale

Acting Commissioner of Patents.

(Seal)

re-starting the motor at predetermined intervals to control the timing of the signal cycle, and manually operable switch mechanism in the driving motor circuit adapted for opening and closing said circuit at will to permit holding the motor at rest independently of the automatic timing means and with the traffic change signal at display, thus temporarily prolonging the period of the traffic change signal and the stop or go signal which is displayed simultaneously therewith.

19. In a traffic control device, stop and go signals and a traffic change signal, a source of energy supply, a driving motor, switch mechanism actuated thereby connected for energizing the stop and go signals alternately, and including means to arrest the motor when either the stop signal or the go signal is energized for display, said mechanism also including means by which the traffic change signal is energized only when the driving motor is running, a cycle-timing motor and a second switch mechanism actuated periodically thereby and connected for restarting the driving motor after each arrest thereof, to change the signal display, a separate electric circuit in which a common source of electrical energy and all of said cycle motors at the several stations are included, and means in the cycle motor circuit, but not included in the driving motor circuit, for varying the voltage of the current supplied to said cycle motors to regulate the time length of the signal cycle for all the stations simultaneously, the current supply for the driving motor at each station being thus unaffected by the variation in the voltage of the current supply for the cycle motors, whereby the driving motor speed is independent of adjustments of the voltage-varying means for altering the length of the cycle.

EDWARD J. SCHULENBURG.

CERTIFICATE OF CORRECTION.

Patent No. 2,141,046.   December 20, 1938.

EDWARD J. SCHULENBURG.

It is hereby certified that error appears in the printed specification of the above numbered patent requiring correction as follows: Page 10, second column, line 6, claim 15, for the word "contact-opening" read contact-operating; and that the said Letters Patent should be read with this correction therein that the same may conform to the record of the case in the Patent Office.

Signed and sealed this 27th day of June, A. D. 1939.

Henry Van Arsdale (Seal)    Acting Commissioner of Patents.